No. 620,067. Patented Feb. 21, 1899.
J. WRIGHT.
LAWN MOWER.
(Application filed Aug. 5, 1898.)
(No Model.) 2 Sheets—Sheet 1.

Witnesses
L. C. Hills.
H. L. Ames.

Inventor:
John Wright,
by V. D. Stockbridge
his Attorney.

THE NORRIS PETERS CO., PHOTO-LITHO., WASHINGTON, D. C.

No. 620,067. Patented Feb. 21, 1899.
J. WRIGHT.
LAWN MOWER.
(Application filed Aug. 5, 1898.)
(No Model.) 2 Sheets—Sheet 2.
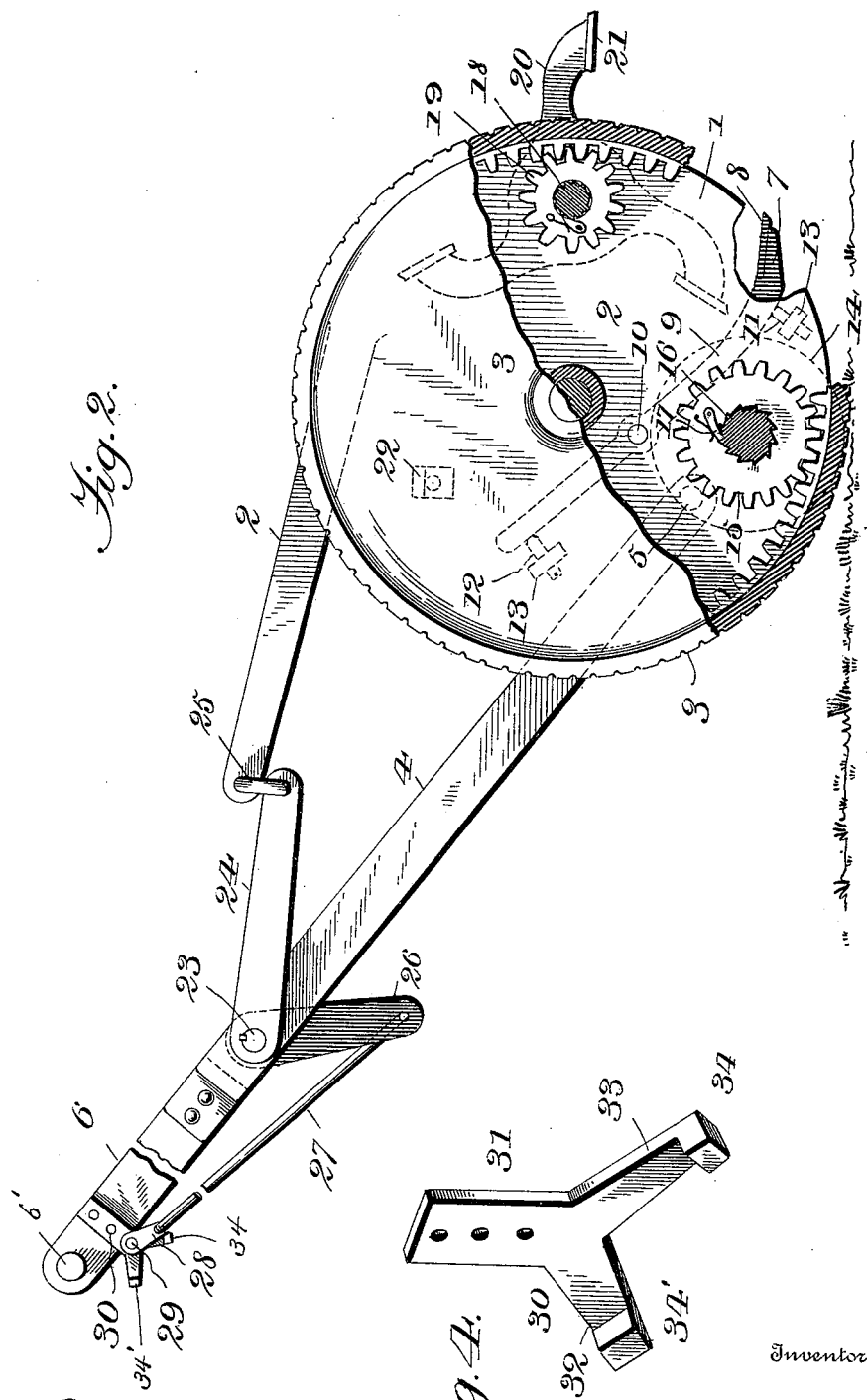
Witnesses
L. C. Hills
H. L. Amer
Inventor:
John Wright,
by V. S. Stockbridge
his Attorney.

UNITED STATES PATENT OFFICE.

JOHN WRIGHT, OF BRUSSELS, CANADA.

LAWN-MOWER.

SPECIFICATION forming part of Letters Patent No. 620,067, dated February 21, 1899.

Application filed August 5, 1898. Serial No. 687,814. (No model.)

*To all whom it may concern:*

Be it known that I, JOHN WRIGHT, a citizen of Canada, residing at Brussels, in the Province of Ontario and Dominion of Canada, have invented certain new and useful Improvements in Lawn-Mowers; and I do hereby declare the following to be a full, clear, and exact description of the invention, such as will enable others skilled in the art to which it appertains to make and use the same.

The invention relates to a lawn-mower, and more specifically to the arrangement of means for actuating the rotary knives thereof and for effecting the adjustment of the cutting apparatus relative to the driving-wheels of the machine for throwing the said cutting apparatus into operative position or for lifting it from the ground for transportation or movement of the machine from place to place.

The nature of the improvements will be understood from the following description and claims, reference being had to the accompanying drawings, in which—

Figure 1:
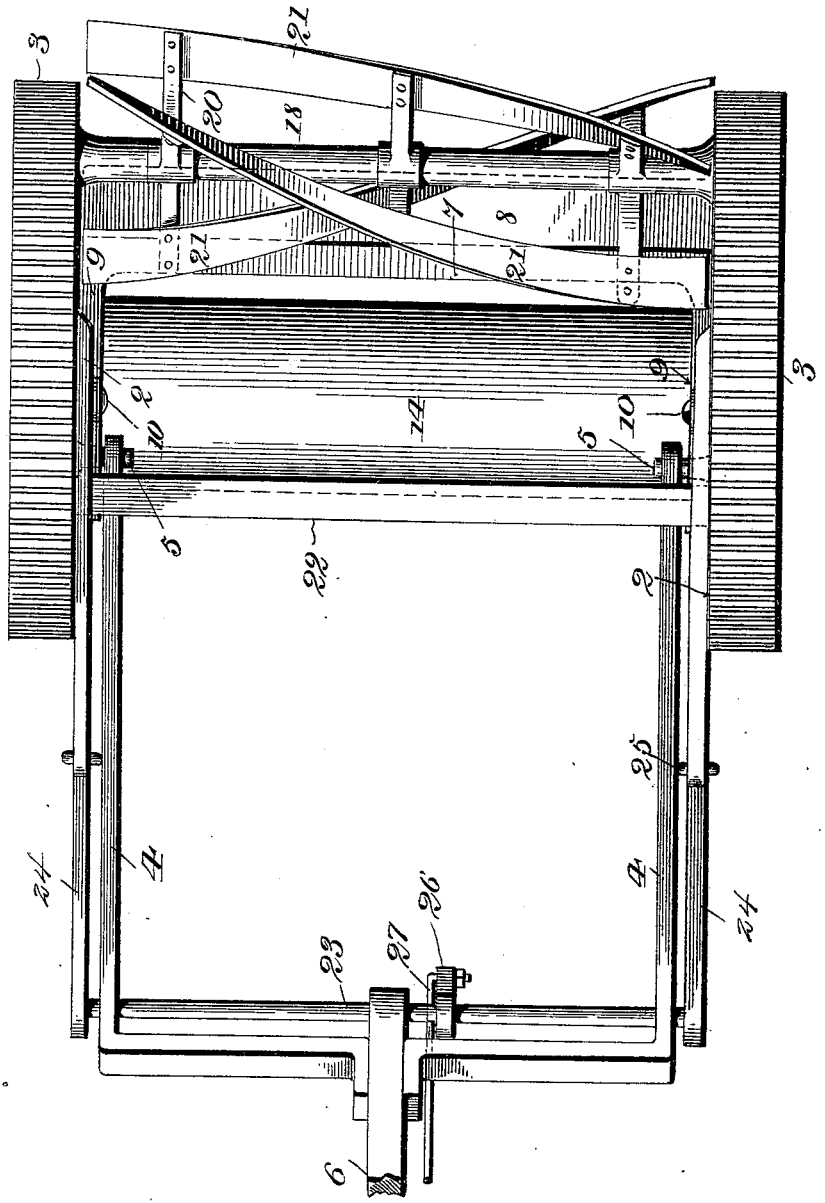
Figure 3:
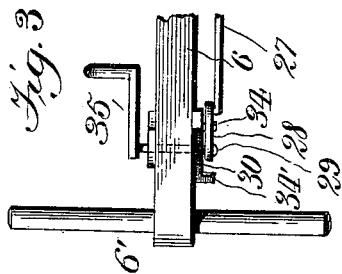

Figure 1 is a plan view of the lawn-mower embracing the invention. Fig. 2 is a side elevation of the same with the adjacent driving-wheel in section to show the arrangement of parts otherwise concealed. Fig. 3 is a plan view of the rear end of the thrust-bar, showing the means for effecting the adjustment of the cutting apparatus and the thrust-bar frame. Fig. 4 is an enlarged side elevation of the angular bracket for holding the adjustment.

1 1 indicate disks which, in connection with rearwardly-extending bars or arms 2, rigidly secured to said disks, form the main frame of the machine, the disks being provided with outwardly-projecting studs or pintles upon which the driving-wheels 3 3 are mounted. These wheels are preferably composed each of a disk provided with a peripheral and inwardly-extending flange having operative cogs or teeth formed upon its inner face, said teeth being covered upon their inner faces by the disks 1 for protecting them from dirt or other obstructing material in a well-known manner. The arms or bars 2 are braced or otherwise rigidly secured to the disks 1.

4 4 represent L-shaped thrust frame-bars pivoted at their forward ends to studs or pins 5 on the disks 1 at points in rear of and below the axle-pintles on which the drive-wheels are mounted. These bars 4 are bent inwardly toward each other at their rear ends and are secured by suitable rearwardly-turned foot-flanges to the thrust bar or handle 6.

7 indicates a transverse bar provided at its forward edge with an offset in which is mounted the stationary knife 8, the bar 7 being provided at its ends with rearwardly-extending arms 9, pivoted at 10 to the wheel-covering disks or frame-plates 1, one upon each side, as shown. The pivotal point 10, upon which the adjustment of the stationary knife of the machine is effected, is located intermediate the spindles upon which the ground-wheels are mounted and the pivotal pins through which the thrust-frame is connected with said plates, and the adjustment of the stationary knife is effected by means of set-screws 11 and 12, passing through suitable inwardly-projecting lugs 13, formed upon the disks 1, one of said set-screws upon each side being located beneath the bar 7, carrying the stationary cutter, and the other at the rear upper ends of the pivoted arms 9 in such manner as to permit the ready adjustment of the stationary knife and to hold the same firmly when properly adjusted.

14 indicates a ground-roller extending between the frame-disks 1 and having trunnions journaled in said disks, the trunnions inside of said disks being provided with pinions 15, which engage the teeth of the driving-wheels and are operated thereby, or by the movement of the roller resting upon the ground said pinions are made to actuate the driving-wheels when from any cause, such as an intervening ridge or obstruction, the driving-wheels are temporarily lifted from the ground. These pinions 15 are connected with the trunnions of the roller by means of a circle of ratchet-teeth 16 on the trunnions and spring-pressed pawls 17, pivoted to the pinions, which serve to engage the pinions with said trunnions in the forward movement of the roller when the latter is resting on the ground and permit the pinions to freely rotate without actuating the roller when the latter is lifted from the ground in the forward movement of the machine upon its wheels.

18 indicates the shaft of the rotary cutter, journaled at its ends in the frame-disks 1 and provided inside of said disks with pinions 19, connected by the usual pawl and backing ratchets, as indicated, with said shaft 18 for causing the latter to be rotated in the forward movement of the machine, but permitting it to remain idle when the machine is backed or drawn in an opposite direction in a manner that is well understood. Upon this shaft, between the wheels, are mounted suitable arms 20, carrying spirally-arranged cutters 21, which operate in connection with the stationary knife 8 in a well-known manner.

22 indicates a brace rigidly connecting the frame-disks, preferably at a point in rear of and above the axle, as shown. The thrust frame-bars 4 are perforated near their rear inturned ends to form bearings for the rock-shaft 23, journaled therein, and preferably the thrust or handle bar 6 is extended forward of its connection with the thrust frame-bars 4 and perforated to form a central bearing for said rock-shaft 23, as shown. The outer ends of the rock-shaft are provided with forwardly-extending arms 24, to the forward ends of which are pivoted links 25, which at their upper ends are pivoted to the frame-bars 2. The shaft 23 adjacent to its central bearing in the thrust-bar 6 is provided with a pendent arm 26, rigid on said shaft and having its lower end connected by a rod 27 with an arm 28 on a rock-shaft 29, journaled in a two-armed bracket 30, secured through an upright ear 31 to the thrust or handle bar 6 near its rear end. The pendent arms 32 and 33 are provided each at its outer end with an angular projection 34 and 34', which serves as a stop limiting the movement of the arm 28 in opposite directions. The end of the rock-shaft 29 opposite that carrying the arm 28 is provided with a crank-arm 35 for enabling the attendant to rock the arm 28 from one stop on the arm 33 to the opposing stop on the arm 32. These stops, it will be seen, leave the arm 28 in either position below the line of the shaft 29 and thereby serve to lock the rod connecting it with the pendent crank-arm 26 in either position of its adjustment.

By the foregoing arrangement it will be seen that when the crank-arm 35 is operated for throwing the arm 28 from the position shown in Fig. 2, in which it is thrown forward and rests upon the stop 34, up, rearward, and downward until it rests upon the stop 34' the arm 26 will be drawn backward and operating through the shaft 23 forces the arms 24 downward, carrying with them, relatively to the thrust-frame, the frame-bars 2. Practically, if the thrust-frame bar were left free to rise upon its pivot said frame would be drawn upward instead of the frame-bars 2 being drawn downward; but the thrust or handle-bar 6 being firmly grasped and held by the operator through the medium of the usual handle 6', the operation of said crank-arm 35, as described, will be to impart a forward movement to the lower face of the frame-disks 1 relatively to the ground-wheels, and thereby to rock the ground-roller 14 and stationary knife and rotary cutters forward and upward from the ground, thereby, under the construction described, enabling the machine to be moved in a reverse direction or rearward relative to the usual movement of the machine without operating the rotary knives.

Aside from the particular features of construction above described the machine may be of any usual or preferred construction and arrangement of parts.

Having thus described the invention, what is claimed as new, and desired to be secured by Letters Patent, is—

1. In a lawn-mower, the combination with the driving-wheels and the gear-covering frame-disks therefor, of the ground-roller extending between the wheels and journaled in said disks, and pinions on the shaft of said roller in mesh with the teeth of said driving-wheels.

2. In a lawn-mower, the combination with the driving-wheels and the gear-covering frame-disks therefor, of the interposed ground-roller journaled in said disks, and pinions on the shaft of said roller in mesh with the teeth of said driving-wheels and having each a pawl-and-ratchet connection with the shaft of the roller, for the purpose and substantially as described.

3. In a lawn-mower, the combination with the ground-wheels, the frame-disks covering the gearing of said wheels provided with rearwardly-extending rigid arms or bars, a thrust-frame pivoted to said disks, a rock-shaft journaled in said thrust-frame and provided with an arm connected by a link to said rearwardly-extending frame-bars, a pendent arm on said rock-shaft, a connecting-rod between said pendent arm and an arm on a second rock-shaft journaled in brackets on the thrust-bar, and means for adjusting said second rock-shaft for effecting the adjustment of the cutting apparatus and ground-roller relative to the ground, substantially as described.

4. The combination in a lawn-mower of the internally-cogged carrying-wheels 3, the frame-plate cover-disks 1 on which said wheels are journaled, arms 2 rigid on said disks, the thrust frame-bars 4 pivoted to said disks, a rock-shaft 23 journaled in said frame-bars and provided with forwardly-extending arms 24 linked to the rigid frame-disk arms 2, a pendent arm 26 on said rock-shaft, a rock-shaft 29 journaled in a two-armed bracket 30 on the thrust or handle bar, a crank-arm 28 on said second rock-shaft, a connecting-rod 27 connecting the arms 26 and 28, stops on a two-armed bracket for limiting the throw of the arm 28 arranged to hold the said arm locked in either position of adjustment, and means for actuating the crank-arm 28 for effecting the relative adjustment of the thrust-frame and the frame-disks on which the carrying-wheels are mounted, substantially as described.

In testimony whereof I affix my signature in presence of two witnesses.

JOHN WRIGHT.

Witnesses:
JAMES A. TURNBULL,
J. G. SKENE.